(12) United States Patent
Kohli et al.

(10) Patent No.: US 10,745,629 B2
(45) Date of Patent: Aug. 18, 2020

(54) PROCESS FOR UPGRADATION OF HEAVY CRUDE OIL/RESIDUE USING WASTE PLASTIC AS HYDROGEN DONATING AGENT

(71) Applicant: Council of Scientific and Industrial Research, Rafi Marg, New Delhi (IN)

(72) Inventors: Kiritika Kohli, Mohkampur (IN); Ravindra Prajapati, Mohkampur (IN); Samir Kumar Maity, Mohkampur (IN); Madhukar Onkarnath Garg, Mohkampur (IN)

(73) Assignee: Council of Scientific and Industrial Research, New Delhi (IN)

( * ) Notice: Subject to any disclaimer, the term of this patent is extended or adjusted under 35 U.S.C. 154(b) by 80 days.

(21) Appl. No.: 15/861,263

(22) Filed: Jan. 3, 2018

(65) Prior Publication Data
US 2018/0201847 A1    Jul. 19, 2018

(51) Int. Cl.
| | |
|---|---|
| *C10G 47/22* | (2006.01) |
| *C10G 47/32* | (2006.01) |
| *C10G 47/36* | (2006.01) |
| *C10G 3/00* | (2006.01) |

(52) U.S. Cl.
CPC .............. *C10G 47/22* (2013.01); *C10G 3/40* (2013.01); *C10G 47/32* (2013.01); *C10G 47/36* (2013.01); *C10G 2300/1077* (2013.01); *C10G 2300/205* (2013.01); *C10G 2300/4006* (2013.01); *C10G 2300/4012* (2013.01); *Y02P 30/20* (2015.11)

(58) Field of Classification Search
CPC ........ C10G 47/22; C10G 47/32; C10G 47/36; C10G 3/40; C10G 2300/1077; C10G 2300/205; C10G 2300/4006; C10G 2300/4012; Y02P 30/20
See application file for complete search history.

(56) References Cited

U.S. PATENT DOCUMENTS

| | | | |
|---|---|---|---|
| 4,118,281 A | | 10/1978 | Yan |
| 4,941,966 A | | 7/1990 | Merz et al. |
| 5,061,363 A | | 10/1991 | Farcasiu et al. |
| 5,158,982 A | * | 10/1992 | Stapp ........................ C10G 1/06 208/15 |
| 5,755,955 A | * | 5/1998 | Benham ................. C10G 47/26 208/112 |
| 5,936,134 A | | 8/1999 | Mastral Lamarca et al. |
| (Continued) | | | |

OTHER PUBLICATIONS

Ali, M. F., et al., "Study on the Conversion of Waste Plastics/Petroleum Resid Mixtures to Transportation Fuels", J. Mater Cycles Waste Management, 2004; 6 (1), pp. 27-34, Springer-Verlag.
(Continued)

*Primary Examiner* — Prem C Singh
*Assistant Examiner* — Brandi M Doyle
(74) *Attorney, Agent, or Firm* — Alston & Bird LLP

(57) ABSTRACT

Waste plastics are mixed with heavy crude and vacuum residues at temperature within the range from 180-220° C. and the resulting mixture are hydroprocessed to produce lighter products. The hydrodemetallization, asphaltene conversion and hydrocracking activities of the resulting mixture have been tested in an autoclave batch reactor. This process provides a very cheap material and method to upgrade problematic feeds to produce transportation fuels.

7 Claims, 4 Drawing Sheets

(56) References Cited

U.S. PATENT DOCUMENTS

2017/0096525 A1* 4/2017 Alemán Vázquez et al. ...............
C08G 63/66
2018/0216009 A1* 8/2018 Narayanaswamy ... C10G 47/32

OTHER PUBLICATIONS

Ali, M. F., et al., "Transportation Fuels From Catalytic Co-pyrolysis of Plastic Wastes With Petroleum Residues: Evaluation of Catalysts by Thermogravimetric Analysis", Petroleum Science and Technology, 2013, 31 (16), pp. 1665-1673, Taylor & Francis Group, LLC.
Kunze et al., "Swamp Phase Hydrogeneration of Plastics, Part 2." Plaste and Kautschuk, 1993, 40, pp. 159-164, Deutscher Verlag fur Grundstoffindustrie.
Uçar, S. et al., "Conversion of polymers to fuels in a refinery stream", Polymer Degradation and Stability, 2002; 75; pp. 161-171, Elsevier Science Ltd.

* cited by examiner

PROCESS FOR UPGRADATION OF HEAVY CRUDE OIL/RESIDUE USING WASTE PLASTIC AS HYDROGEN DONATING AGENT

CROSS REFERENCE TO RELATED APPLICATIONS

This application claims priority to Indian Patent Application No. 201711001597, filed on Jan. 16, 2017, the contents of which as are hereby incorporated by reference in its entirety.

BACKGROUND

Related Field

The present invention relates to a process for upgradation of heavy crude oil/residue using waste plastic as hydrogen donating agent. The present invention further relates to overcome the inconveniences of the conventional methods of processing heavy feeds such as heavy crude oils and vacuum residues by providing a suitable method to increase the amounts of distillate products.

More particularly, the present invention relates to provide a material having high hydrogen donating agent in reaction media, high activity of conversion of hydrodemetallization (HDM) as well as liquid residue cracking.

Description of Related Art

Heavy oils/residues are becoming increasingly important due to the decrease in conventional oils and increasing demand of middle distillates for transportation fuels. The residual feedstocks contain large amount of coke precursors (mainly aspahltenes) and contaminants i.e. compound containing sulphur, metals and nitrogen. Heavy feeds especially vacuum residues have low H/C ratio and refiners have to cope with the upgrading of these problematic feeds. The catalysts used in conventional hydroprocessing processes deactivate very fast due to the presence of very high metal and asphaltene content. Residue upgradation in the refinery is usually done by two ways:—either one can remove the carbon using carbon rejection processes such as delayed coking, visbreaking and solvent deasphalting or one can add hydrogen (hydrogen addition process) via hydoprocessing. Hydrogen addition is very attractive way to upgrade because it not only gives the higher value of lighter products but also increases the H/C ratio of the products.

Asphaltene which is the precursor of coke is very problematic to the refiners. Coke causes several problems such as coke deposition on the reactor walls as well as on the catalysts, low efficiency of usage of hydrogen and low quality of products.

The presence of high concentration of Ni and V also causes deactivation of the catalysts as theses accumulates as metal sulphides on the active sites of the catalysts. The availability of hydrogen is also one of the major limitations in the upgradation processes because this will limits the hydrogenative reaction pathways.

To overcome these problems, use of hydrogen either by increase in hydrogen partial pressure or using hydrogen donating hydrocarbons may be an efficient alternative for residue upgrdation. Increase in hydrogen partial pressure is an expensive process. Solvents such as tetralin, decalin, naphthalene are reported for use as hydrogen donating hydrocarbons. The formation of sediments at the higher conversion level and high operating costs of these solvents are major disadvantage of this process.

U.S. Pat. No. 4,118,281 describes a method of slurrying the solid organic waste with hot coker recycle feed at temperature in the range 300 to 1000° F.

U.S. Pat. No. 4,941,966 discloses a process for the hydrogenative conversion of mixtures of heavy/residual oils and organic waste product. The 0.1-10 wt % of an additive of high surface area suspended solids containing carbon, red mud, iron oxide and cyclone dusts. The mixture was processed at a hydrogen partial pressure of 50-350 bar, temperature of 250-500° C. and a gas/oil ratio of 100 to 1000 m3/t.

U.S. Pat. No. 5,061,363 discloses a method for the co-processing of waste rubber and carbonaceous material to form useful liquid product. The reaction is studied 60 minutes in a laboratory shaker bomb in 1000 psi hydrogen pressure and 425° C. temperature.

U.S. Pat. No. 5,936,134 discloses a method for the co-processing of waste rubber especially waste tires and coals to obtain storable products of high calorific energy. They used a red mud containing 23.5 wt % of Fe as catalyst. The reaction conditions used were 30 minutes, temperature of 400° C., at a hydrogen pressure of 10 kg/cm2 in a tubular reactor type tubing bomb having a volume of 160 ml.

Ali et al., Petroleum Science and Technology 2013; 31: 1665-1673 and J. Mater cycles waste manag 2004; 6: 27-34 reported the use of thermogravimetric analysis (TGA) to compare the activity of different catalysts for the polypropylene degradation and its copyrolysis with petroleum vacuum residue (VR). The author concluded that VR act as solvent media for waste plastic degradation. The results indicate that the higher temperature of initial weight loss of polypropylene was decreased significantly by the addition of VR.

Polymer Degradation and Stability 2002; 75: 161-171 wherein the hydrocracking of polymers (LDPE, PE, PVC, PP) with vacuum gas oil (VGO) using HZSM-5, DHC-8 and Co—Ac catalysts was studied by Ucar et al.

Kunze et al., Plaste and Kautschuk, 1993, 40, 159-64 described a liquid phase hydrogenation of plastics. For this, slurries were prepared by mixing at high temperature, petroleum vacuum distillation residues with cryogenically shredded waste polyethylene, polypropylene and polyvinyl chlorides. The reaction conditions used were 470° C. temperature and 1.5 h reaction time.

In order to remove the limitations of the prior art processes, there is a need to develop a process for upgradation of crude oil/residue.

BRIEF SUMMARY

The main objective of the present invention is to provide a process for upgradation of heavy crude oil/residue using waste plastic as hydrogen donating agent. Another, objective of the present invention is to overcome the inconveniences of the conventional methods of processing heavy feeds such as heavy crude oils and vacuum residues by providing a suitable method to increase the amounts of middle distillates and also improves the product quality by increasing H/C ratio.

Yet another objective of the present invention is to provide a material having high hydrogen donating hydrocarbons in reaction media, high activity for hydrodemetallization (HDM) and high conversion of residues.

Accordingly, the present invention provides a method to upgrade heavy oils and residues using waste plastic as a hydrogen donating hydrocarbon.

In an embodiment of the present invention, the heavy crude and its vacuum residue are characterised for further used in hydrocracking experiments.

In another embodiment, the present invention provides a process comprising the steps of:—
  i. mixing the waste plastic materials to the heavy crude to obtain a mixture;
  ii. preheating the mixture as obtained in step (i) at a temperature in the range of 130-180° C. for a period in the range of 20-30 minutes.
  iii. reacting the heavy crude with waste plastic in a batch reactor at a temperature in the range of 420-450° C., at a pressure in the range of 40-60 kg/cm2 for a period in the range of 30-60 minutes to obtain products;
  iv. separating the liquid and solid phases as obtained in step (iii);
  v. soxhlet extraction of solid phase followed by drying to obtain toluene insolubles (coke).

The mixture of waste plastic and heavy crude subjected to hydrocracking experiments. The process is useful for hydroprocessing reactions comprising hydrodemetallisation (HDM), asphaltene conversion, microcarbon residue (MCR) conversions and hydrocracking for the heavy crude/residues.

In yet another embodiment of present invention, the process is useful for hydroprocessing reactions for the vacuum residue upgradation.

In still another embodiment of the invention the process shows high conversion of hydrodemetallization (97 wt %) and high conversions of hydrocracking (84 wt %) with vacuum residue (VR-I) mixed with waste plastic.

In a further embodiment of the invention, the heavy contaminant crude employed as feedstock in process comprising high metals content >100 wppm; high microcarbon residue content >3 wt %; and containing 550OC plus material not less than 20 wt %.

In still another embodiment of the invention, the vacuum residue employed as feedstock comprising high metals content >150 wppm; high microcarbon residue content in the range 5-25 wt %; and containing 550OC plus material not less than 60 wt %.

In still another embodiment of the invention, the ratio of crude oil/residue and plastic ranges 1:1 to 4:1.

In one more embodiment of the invention, the plastic used in the process is selected from plastic used for packaging purposes.

In still another embodiment of the invention, the plastic used in the process is waste plastic.

DETAILED DESCRIPTION OF VARIOUS EMBODIMENTS

Figure 1:
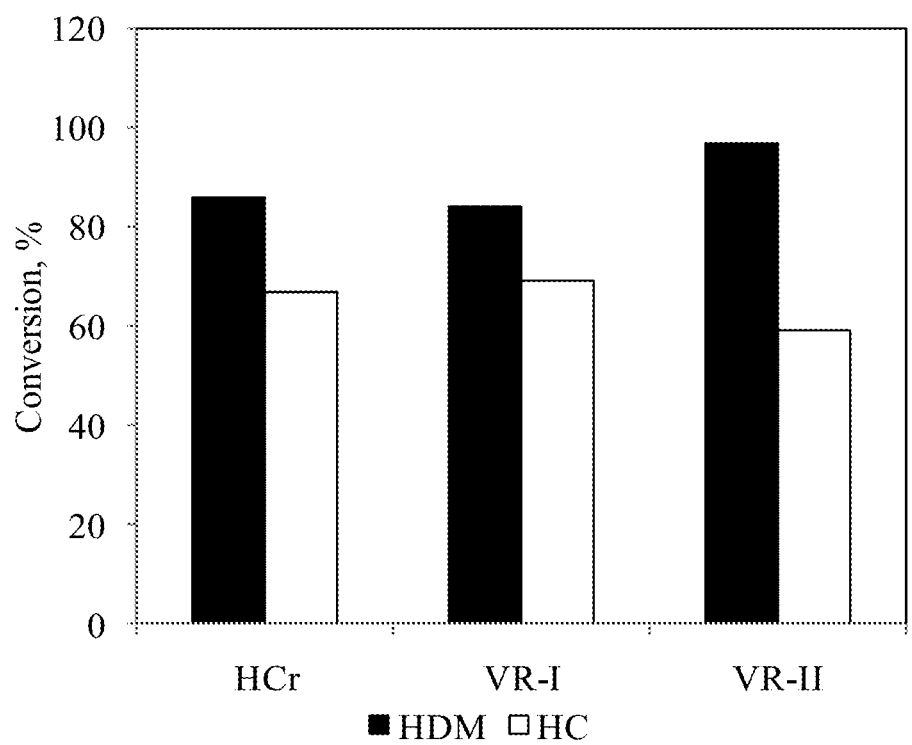
FIG. 1 is a depiction of the conversions in terms of metal (HDM) and hydrocracking activity (HC).

In the present invention, heavy vacuum residue (asphaltenic containing feedstocks) in combination with waste plastic as a hydrogen donating hydrocarbons is heated to a temperature in the presence of hydrogen gas under pressure.

Preferably, the hydroprocessing reactions were performed in a batch reactor employing suitable operating conditions using heavy crude and vacuum residue as feedstocks. These feeds contain high percentage of sulphur, metals and asphaltenes. Therefore present invention, also relates to the removal of metals, sulphur and asphaltenes from residues. Specifically the waste plastic was added to enhance the hydrocracking of residues (HC), hydrodemetallization (HDM), hydrodesulfurization (HDS), asphaltene conversion (HDAs) and decreases coke yield. For this purpose, high pressure and high temperature batch reactor was used to carry out hydroprocessing reactions. Suitable hydroprocessing conditions include temperature of 380-550° C., preferably 390-470° C. and most preferably 410-450° C., a pressure in the range of 80-120 kg/cm$^2$, preferable 60-100 kg/cm$^2$ and most preferably 40-60 kg/cm$^2$ was used. The reaction time for this residue conversion in the range of 30-120 minutes can be used. The required amount of feed and waste plastic was taken into the reactor. The reactor system is closed properly and leak test was performed. The reactor was then purged three times with pure hydrogen. The reactor was then pressured with the adequate hydrogen so that the pressure should reach to the desired pressure at the given reaction temperature. When the temperature reached to the reaction temperature, the feed and waste plastic mixture was stirred at 700 rpm. The reaction was continued around 30-120 minutes. After reaction the liquid product was separated from solid product and sulfur, metals and its distillation of liquid product were analyzed The depolymerisation of waste plastic will provide hydrogen donating hydrocarbons to the free radicals produced from the cracking of vacuum residues. During the hydrogenation reactions, a significant amount of the distillate fractions is produced.

The waste plastic includes a higher percentage of hydrogen and therefore reduces the extra hydrogen requirements.

The waste plastic as a hydrogen donating agent is an efficient process. These are hydrogen rich and investment is almost negligible. Therefore this is the most cost effective process. In this process, an appropriate amount of waste plastic is mixed with feed and the mixture is sent to the reactor chamber where the hydrocracking conversion occurs at elevated temperature. The main purpose of the waste plastic used here is inhibition of coke formation during thermal cracking of residual molecules into the lighter fractions.

The major advantages of the present invention are:—
Cheap material can be utilized as a hydrogen donating source.
No pretreatment is required with this material before using in upgradation of heavy oils.
The process can be used for very high metals, sulfur and asphaltenes content feedstock.
Coke formation is relatively low and hence through put of the reactor is high.
Very high conversions in terms of hydrocracking, hydrodemettalization and asphaltene can be achievable.

Following examples are given by way of illustrations only and should not construed to limit the scope of the present invention.

Example 1

In the present invention, three different feedstocks:— heavy crude (HCr), its vacuum residue i.e. VR-I and another vacuum residue (VR-II) having high asphaltene content are used as feedstocks. The properties of these feeds are given in Table 1. Vacuum residue (VR-I) is highly viscous and contains high metals, asphaltene content than its heavy crude (HCr). VR-II contains very high asphaltene (14.03%), metals (175 ppm) and MCR (26%) than other feeds.

TABLE 1

Properties of the feeds

| Properties | HCr | VR-I | VR-II |
|---|---|---|---|
| Density (g/mL) at 15.6° C. | 0.8633 | 0.9175 | |
| $K_{vis}$ (cSt) at 100° C. | 13.72 | 79.764 | 30693 |
| Ni (wppm) | 99.2 | 153.7 | 40.4 |
| V (wppm) | 2.5 | 4.6 | 134.5 |
| Ni + V (wppm) | 101.7 | 158.3 | 174.9 |
| H/C (atomic ratio) | 1.59 | 1.45 | 1.46 |
| MCR (wt %) | 4.84 | 8.63 | 26.19 |
| Asphaltene (wt %) | 0.27 | 0.94 | 14.03 |

In this particular case, the hydrocraking activity of the heavy crude was performed as:—One litre batch reactor was used for the hydrocracking activity test in this invention. An appropriate amount of the heavy crude was taken into the reactor vessel and the amount of the feed is chosen 400 gram, preferably 200 gram and most preferably 100 gram. At normal temperature the feedstock is in solid form. The preferred reaction temperature is 390° C., and the most preferred temperature is 420° C. Total reaction time fixed around 60 minutes. The preferred reaction pressure is 40 kg/cm$^2$ and the most preferred pressure is 60 kg/cm$^2$. The required amount of feed was taken into the reactor. The reactor system was closed properly and leak test was performed. The reactor was then purged three times with pure hydrogen. The reactor was then pressured with the adequate hydrogen so that the pressure should reach to the desired pressure at the given reaction temperature. When the temperature reached to the reaction temperature, the reaction mixture was stirred at 700 rpm. The reaction was continued around 60 minutes. After reaction, the reactor is cooled down to room temperature to obtain a mixture of liquid and solid phases. The liquid product is separated from solid product. The amount of toluene insolubles (Coke) was obtained by soxhlet extraction of solid product followed by drying at 110° C. for 6 h.

The conversions of HDM and residue conversions are calculated with the following equation:—

% HDM conversion=(1−metals in product/metals in feed)×100%

Hydrocracking conversion (HC)=(1−550° C.$^+$material in product/550° C.$^+$material in feed)×100

Figure 2:
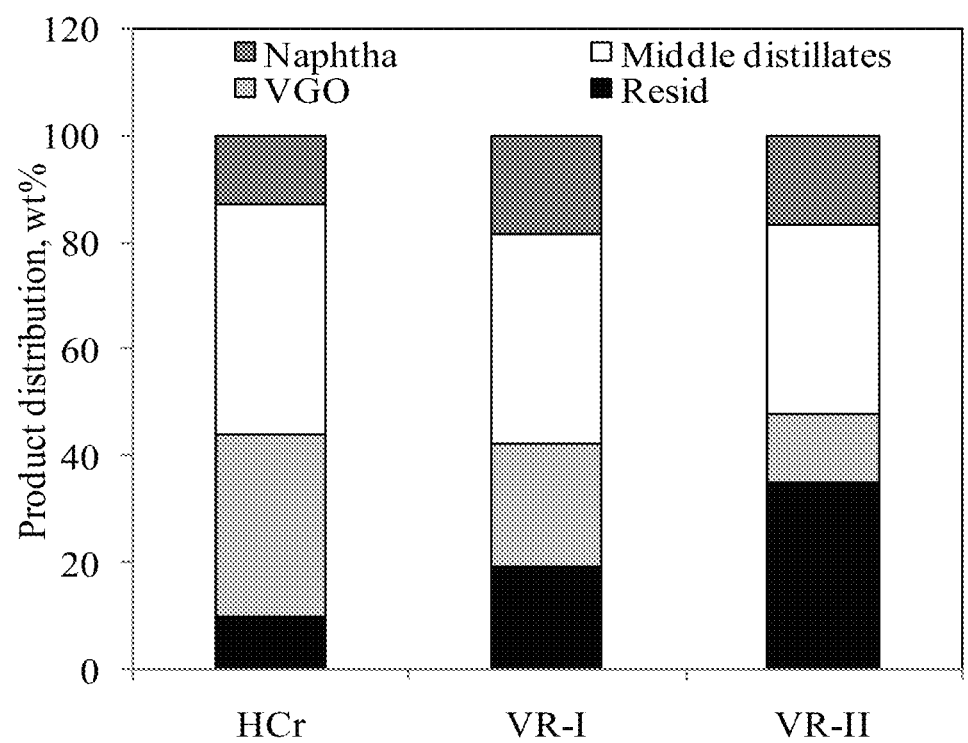
FIG. 2 is a depiction of the percentage of the distillate products such as naphtha, middle distillates, vacuum gas oil and resid obtained.

The physic-chemical properties of the hydrocracked product are given in Table 2 and the conversions in terms of metal (HDM) and hydrocracking activity (HC) are given in FIG. 1. The percentage of the distillate products such as naphtha, middle distillates, vacuum gas oil and resid obtained are given in FIG. 2. The hydrocracking conversion (HC) with heavy crude is 67% and resid fractions of heavy crude were mainly converted into vacuum gas oil (VGO).

TABLE 2

Properties of the upgraded products

| Properties | HCr | VR-I | VR-II |
|---|---|---|---|
| Density (g/mL) at 15.6° C. | 0.8092 | 0.8294 | 0.8567 |
| $K_{vis}$ (cSt) at 15.6° C. | 5.382 | 5.539 | 3.379 |

TABLE 2-continued

Properties of the upgraded products

| Properties | HCr | VR-I | VR-II |
|---|---|---|---|
| H/C (atomic ratio) | 1.75 | 1.56 | 1.50 |
| MCR (wt %) | 2.82 | 3.31 | 4.71 |
| Asphaltene (wt %) | 0.18 | 0.53 | 5.82 |
| Coke yield* (wt %) | 9.84 | 19.48 | 35.12 |

*Coke yield -toluene insoluble, Reaction parameters: - temperature: - 420° C., total pressure: - 60 kg/cm$^2$ and reaction time: -60 min.

Example 2

Vacuum residue (VR-I) obtain from the feed heavy crude (HCr) as described in example 1 is used as feed and subjected to the same process as that of example 1. The physic-chemical properties of this hydrocracked product are given in Table 2 and HDM, HC conversions are given in FIG. 1. The distillate products such as naphtha, middle distillates and vacuum gas oil are given in FIG. 2. The HDM and HC conversions with this feed are 84 and 69% respectively. The amount of middle distillates and VGO produced are 39 and 23% respectively.

Example 3

In this particular case, VR-II as explained in example 1 is used as feed and hydrocracking reactions are performed as that of example 1. The product properties are given in Table 2 and conversions are presented in FIG. 1. The product distribution of this hydrocraked product is given in FIG. 2. The hydrocracking conversion and production of middle distillates with feed VR-II is 59 and 36% respectively.

Example 4

Figure 3:
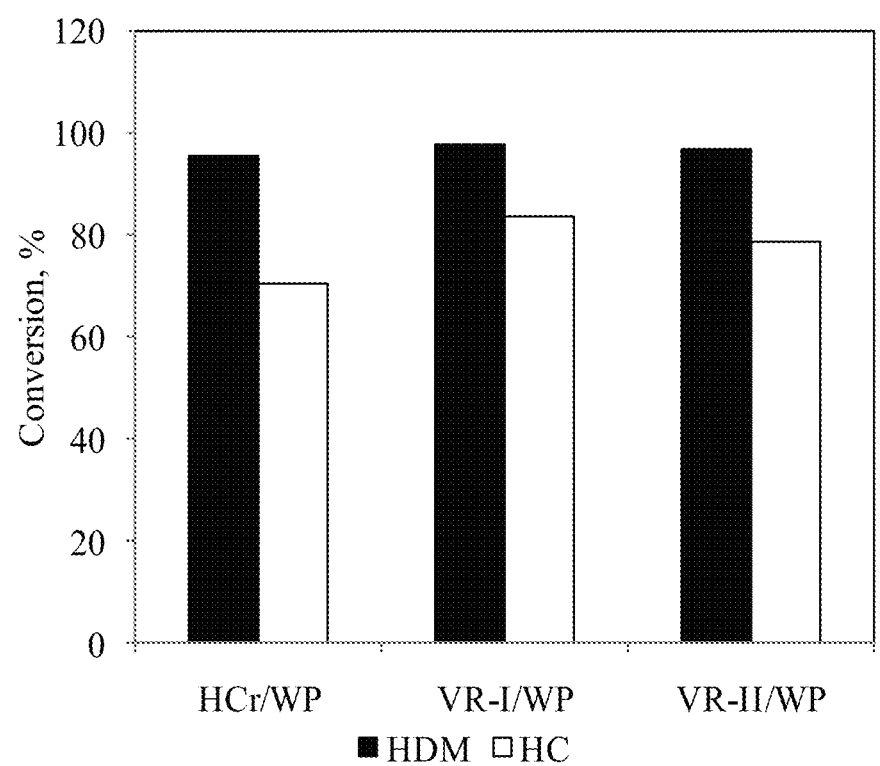
FIG. 3 is a depiction of the conversions of the properties of the hydrocracked products given in Table 3.
Figure 4:
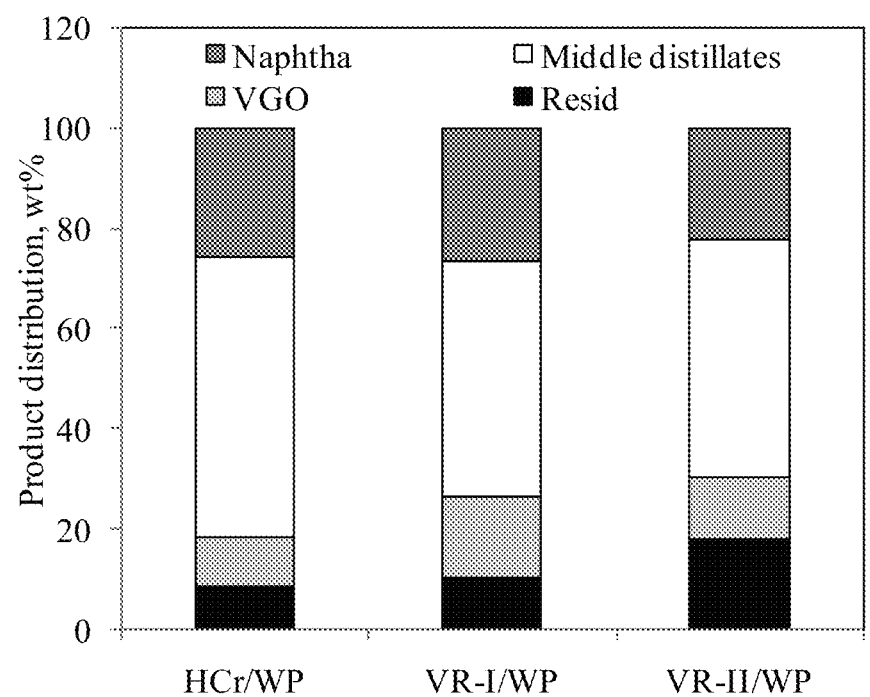
FIG. 4 is a depiction of the amount of naphtha and middle distillates produced.

The plastic material which is used for packaging purposes was collected and chopped for the present study. This embodiment is prepared as: −80 gram of waste plastic, preferably 60 gram and most preferably 40 gram is preheated with the heavy crude (60 gram) at temperature in the range 320-380° C., preferably 200-250° C. and most preferably 130-220° C. The hydrocracking activities of the resulting mixture of waste plastic (WP) and heavy crude (HCr) are carried out as a similar procedure as given in example 1. The properties of the hydrocracked products are given in Table 3 and the conversions are presented in FIG. 3. It has been observed that, on addition of waste plastic to heavy crude the HDM and hydrocracking conversion are 95 and 70 wt %. The amount of naphtha and middle distillates produced are 26 and 56 wt % (shown in FIG. 4.).

TABLE 3

Properties of the upgraded products

| Properties | HCr/WP | VR-I/WP | VR-II/WP |
|---|---|---|---|
| Density (g/mL) at 15.6° C. | 0.7961 | 0.8014 | 0.8149 |
| $K_{vis}$ (cSt) at 15.6° C. | 2.52 | 2.87 | 2.035 |
| H/C (atomic ratio) | 1.90 | 1.79 | 1.57 |
| MCR (wt %) | 1.12 | 2.00 | 2.97 |
| Asphaltene (wt %) | 0.19 | 0.32 | 3.04 |
| Coke yield (wt %) | 8.82 | 10.34 | 18.27 |

Example 5

In this particular case, the mixture of waste plastic and vacuum residue VR-I is prepared using the method as explained in example 4 and the hydrocracking activities were performed as same process as described in example 1. The properties of this hydrocracked product are given in Table 3. With the addition of waste plastic to VR-I, the H/C ratio obtained is 1.79 and also the densities and viscosity of the product is substantially improved compared to the thermal cracking of VR-I without using waste plastic (Table 2). The HDM and HC conversions obtained are 98 and 84 wt %. The middle distillate produced with this feed is around 47 wt % as observed form FIG. 4.

Example 6

The mixture of waste plastic and VR-II are prepared using the method as described in example 4 and subjected to hydrocracking process as explained in example 1. The physic-chemical properties of the upgraded product are given in Table 3 and conversions are given in FIG. 3. The distillate fractions i.e. naphtha, middle distillate, VGO and resid are presented in FIG. 4. The hydrocracking conversion and middle distillate production with this feed are 79 and 47 wt %.

Findings

The hydrocracking conversion (HC) obtained with HCr, VR-I and VR-II without waste plastic are 67, 69 and 59% respectively. With the addition of waste plastic (WP) conversions are 70, 84 and 79% for the HCr, VR-I and VR-II respectively. Increased is more with the VR having large asphaltene content.

Middle distillates produced during hydrocracking of HCr, VR-I and VR-II are 43, 39 and 36 wt % respectively. In the presence of waste plastic the distillate products are 56, 47 and 47 wt % for the HCr, VR-I and VR-II respectively.

HDM conversions with feeds HCr, VR-I and VR-II are 86, 84 and 97% but mixture of waste plastic with HCr, VR-I and VR-II the HDM conversions are 95, 98 and 97% conversions.

H/C ratio with HCr, VR-I and VR-II feeds are 1.75, 1.56 and 1.50 but increased to 1.90, 1.79 and 1.57 on addition of waste plastic to these feeds.

Coke yields obtained are:—with HCr 9.84 wt %, with VR-I 19.48 wt % and with VR-II 35.12 wt % whereas with HCr+WP coke yield is 8.82, with VR-I+WP is 10.34 and with VR-II+WP is 18.27 wt %. The coke yield decreases more with VR.

Densities and Kinematic viscosities are also improved with the addition of waste plastic to these heavy feeds.

EXEMPLARY ADVANTAGES OF THIS INVENTION

Cheap material is utilized as hydrogen donating source in hydrocracking conversions of heavy crude and vacuum residue feeds.

No pretreatment is required with this material before using in hydrocracking conversions.

H/C ratio of the hydrocracked products is increased to large extent.

Coke formation is relatively low.

Up to 79% hydrocracking conversions (HC) obtained with waste plastic mixed with vacuum residue feed (VR-II).

Material is also effective for feeds having high content of asphaltenes.

The invention claimed is:

1. A process to make waste plastic as a hydrogen donating agent for hydro-conversion of heavy crude oil and vacuum residues, the process comprising the steps of:
    a) mixing the heavy crude oil or the vacuum residues with waste plastic in a ratio in the range of 1:1 to 4:1 wt % and taken into a reactor vessel,
    b) preheating the mixture obtained in step (a) at a temperature in the range of 130-220° C. for a period in the range of 20-30 minutes, resulting in a preheated mixture,
    c) further heating the preheated mixture obtained in step (b) for hydrocracking reactions at a temperature in the range of 390-420° C. and at a pressure in the range of 40-100 kg/cm$^2$ for a period of 30-90 minutes with stirring in the presence of hydrogen in the reactor vessel to separate desired products.

2. The process as claimed in claim 1, comprising a conversion of hydrodemetallization of 97 wt % and a conversion of hydrocracking of 84 wt % with vacuum residue (VR-I).

3. The process as claimed in claim 1, wherein the heavy crude oil comprises a metals content >100 wppm; comprises a microcarbon residue content >3 wt %; and contains 550° C. plus material not less than 20 wt %.

4. The process as claimed in claim 1, wherein the vacuum residues comprise a metals content >150 wppm; comprise a microcarbon residue content in the range 5-25 wt %; and contain 550° C. plus material not less than 60 wt %.

5. The process as claimed in claim 1, wherein the waste plastic used in the process is plastic used for packaging purposes.

6. The process as claimed in claim 1, wherein the desired product of the process is transportation fuels.

7. The process as claimed in claim 1, wherein the process produces middle distillates.

* * * * *